(12) United States Patent
Richardson et al.

(10) Patent No.: US 11,805,333 B2
(45) Date of Patent: Oct. 31, 2023

(54) NOISE AWARE EDGE ENHANCEMENT

(71) Applicant: DePuy Synthes Products, Inc., Raynham, MA (US)

(72) Inventors: John Richardson, Westlake Village, CA (US); Donald M. Wichern, Ogden, UT (US)

(73) Assignee: DePuy Synthes Products, Inc., Raynham, MA (US)

( * ) Notice: Subject to any disclaimer, the term of this patent is extended or adjusted under 35 U.S.C. 154(b) by 93 days.

(21) Appl. No.: 17/467,756

(22) Filed: Sep. 7, 2021

(65) Prior Publication Data
US 2021/0409627 A1    Dec. 30, 2021

Related U.S. Application Data

(63) Continuation of application No. 16/412,258, filed on May 14, 2019, now Pat. No. 11,115,610, which is a continuation of application No. 14/214,320, filed on Mar. 14, 2014, now Pat. No. 10,341,588.

(60) Provisional application No. 61/791,113, filed on Mar. 15, 2013.

(51) Int. Cl.
| | |
|---|---|
| H04N 5/357 | (2011.01) |
| H04N 25/60 | (2023.01) |
| G06T 5/00 | (2006.01) |
| H04N 5/14 | (2006.01) |
| H04N 23/50 | (2023.01) |

(52) U.S. Cl.
CPC ............ *H04N 25/60* (2023.01); *G06T 5/003* (2013.01); *H04N 5/142* (2013.01); *G06T 2207/20192* (2013.01); *H04N 23/555* (2023.01)

(58) Field of Classification Search
CPC ......... H04N 25/60; H04N 5/142; G06T 5/003
See application file for complete search history.

(56) References Cited

U.S. PATENT DOCUMENTS

| | | | |
|---|---|---|---|
| 4,433,675 A |  | 2/1984 | Konoshima |
| 4,914,746 A | * | 4/1990 | Nishi ................... H04N 1/2158 386/302 |
| 4,945,502 A | * | 7/1990 | Kwon ..................... G06T 5/003 348/625 |
| 5,187,572 A |  | 2/1993 | Nakamura et al. |
| 5,196,938 A |  | 3/1993 | Blessinger |
| 5,241,170 A |  | 8/1993 | Field, Jr. et al. |
| 5,748,234 A |  | 5/1998 | Lippincott |

(Continued)

FOREIGN PATENT DOCUMENTS

| | | | | |
|---|---|---|---|---|
| EP | | 1111907 B1 * | 7/2004 | ............... H04N 1/58 |
| WO | WO 2012/155152 A1 | | 11/2012 | |

OTHER PUBLICATIONS

Machine generated English translation of Japanese Patent Application Publication No. 2010-252265.

(Continued)

*Primary Examiner* — Jonathan R Messmore
(74) *Attorney, Agent, or Firm* — TechLaw Ventures, PLLC; Terrence J. Edwards

(57) ABSTRACT

The disclosure extends to methods, systems, and computer program products for enhancing edges within an image in a light deficient environment, which utilizes knowledge of the expected noise pixel by pixel, to control the strength of the edge enhancement and thereby limit the impact of the enhancement on the perception of noise.

18 Claims, 8 Drawing Sheets

(56) References Cited

U.S. PATENT DOCUMENTS

| | | |
|---|---|---|
| 5,784,099 A | 7/1998 | Lippincott |
| 5,799,111 A * | 8/1998 | Guissin .................. H04N 19/86 |
| | | 358/463 |
| 6,097,848 A * | 8/2000 | Salvati .................... H04N 5/21 |
| | | 348/E5.076 |
| 6,100,920 A | 8/2000 | Miller et al. |
| 6,272,269 B1 | 8/2001 | Naum |
| 6,331,156 B1 | 12/2001 | Haefele et al. |
| 6,485,414 B1 | 12/2002 | Neuberger |
| 6,690,466 B2 | 2/2004 | Miller et al. |
| 6,692,431 B2 | 2/2004 | Kazakevich |
| 6,772,181 B1 | 8/2004 | Fu et al. |
| 6,856,704 B1 * | 2/2005 | Gallagher ............... G06T 5/004 |
| | | 345/597 |
| 6,899,675 B2 | 5/2005 | Cline et al. |
| 6,921,920 B2 | 7/2005 | Kazakevich |
| 6,961,461 B2 | 11/2005 | MacKinnon et al. |
| 6,977,733 B2 | 12/2005 | Denk et al. |
| 6,982,740 B2 | 1/2006 | Adair et al. |
| 6,999,118 B2 | 2/2006 | Suzuki |
| 7,037,259 B2 | 5/2006 | Hakamata et al. |
| 7,189,226 B2 | 3/2007 | Auld et al. |
| 7,258,663 B2 | 8/2007 | Doguchi et al. |
| 7,356,198 B2 | 4/2008 | Chauville et al. |
| 7,540,645 B2 | 6/2009 | Kazakevich |
| 7,544,163 B2 | 6/2009 | MacKinnon et al. |
| 7,545,434 B2 | 6/2009 | Bean et al. |
| 7,791,009 B2 | 9/2010 | Johnston et al. |
| 7,792,378 B2 | 9/2010 | Liege et al. |
| 7,794,394 B2 | 9/2010 | Frangioni |
| 7,813,538 B2 | 10/2010 | Carroll et al. |
| 8,100,826 B2 | 1/2012 | MacKinnon et al. |
| 8,400,534 B2 * | 3/2013 | Lin ........................ H04N 25/60 |
| | | 348/242 |
| 8,411,922 B2 | 4/2013 | Lee et al. |
| 8,559,743 B2 | 10/2013 | Liege et al. |
| 8,736,007 B2 | 5/2014 | Wu et al. |
| 10,341,588 B2 | 7/2019 | Richardson et al. |
| 11,115,610 B2 | 7/2021 | Richardson et al. |
| 2001/0030744 A1 | 10/2001 | Chang |
| 2003/0169353 A1 | 9/2003 | Keshet et al. |
| 2005/0078205 A1 | 4/2005 | Hynecek |
| 2005/0157189 A1 | 7/2005 | Sambongi |
| 2005/0234302 A1 | 10/2005 | MacKinnon et al. |
| 2005/0249417 A1 | 11/2005 | Song et al. |
| 2006/0000282 A1 | 1/2006 | Radcliffe |
| 2006/0069314 A1 | 3/2006 | Farr |
| 2007/0286481 A1 | 12/2007 | Monobe et al. |
| 2008/0045800 A2 | 2/2008 | Farr |
| 2008/0056607 A1 * | 3/2008 | Ovsiannikov ........... G06T 5/002 |
| | | 348/E5.078 |
| 2008/0152210 A1 | 6/2008 | Bendall |
| 2008/0266432 A1 * | 10/2008 | Tsuruoka ................ H04N 23/81 |
| | | 348/E5.064 |
| 2009/0012361 A1 | 1/2009 | MacKinnon et al. |
| 2009/0160976 A1 | 6/2009 | Chen et al. |
| 2009/0292168 A1 | 11/2009 | Farr |
| 2010/0165087 A1 | 7/2010 | Corso et al. |
| 2010/0177170 A1 | 7/2010 | Kusuno |
| 2010/0182446 A1 | 7/2010 | Matsubayashi |
| 2010/0310190 A1 * | 12/2010 | Lin ...................... H04N 25/571 |
| | | 348/241 |
| 2011/0181840 A1 | 7/2011 | Cobb |
| 2011/0237882 A1 | 9/2011 | Saito |
| 2011/0237884 A1 | 9/2011 | Saito |
| 2012/0004508 A1 | 1/2012 | McDowall et al. |
| 2012/0008860 A1 * | 1/2012 | Hirota ........................ G06T 7/11 |
| | | 382/165 |
| 2012/0041267 A1 | 2/2012 | Benning et al. |
| 2012/0078052 A1 | 3/2012 | Cheng |
| 2012/0307030 A1 | 12/2012 | Blanquart |
| 2013/0011081 A1 | 1/2013 | Luo et al. |
| 2019/0281237 A1 | 9/2019 | Richardson et al. |

OTHER PUBLICATIONS

Machine generated English translation of Japanese Patent Application Publication No. 2007-260019.

Machine generated English translation of Japanese Patent Application Publication No. 2002-369794.

Machine generated English translation of Japanese Patent Application Publication No. 2012-085790.

* cited by examiner

Shapes of $y_i$, $f_i$ and $d_i$ for a sharp luminance transition

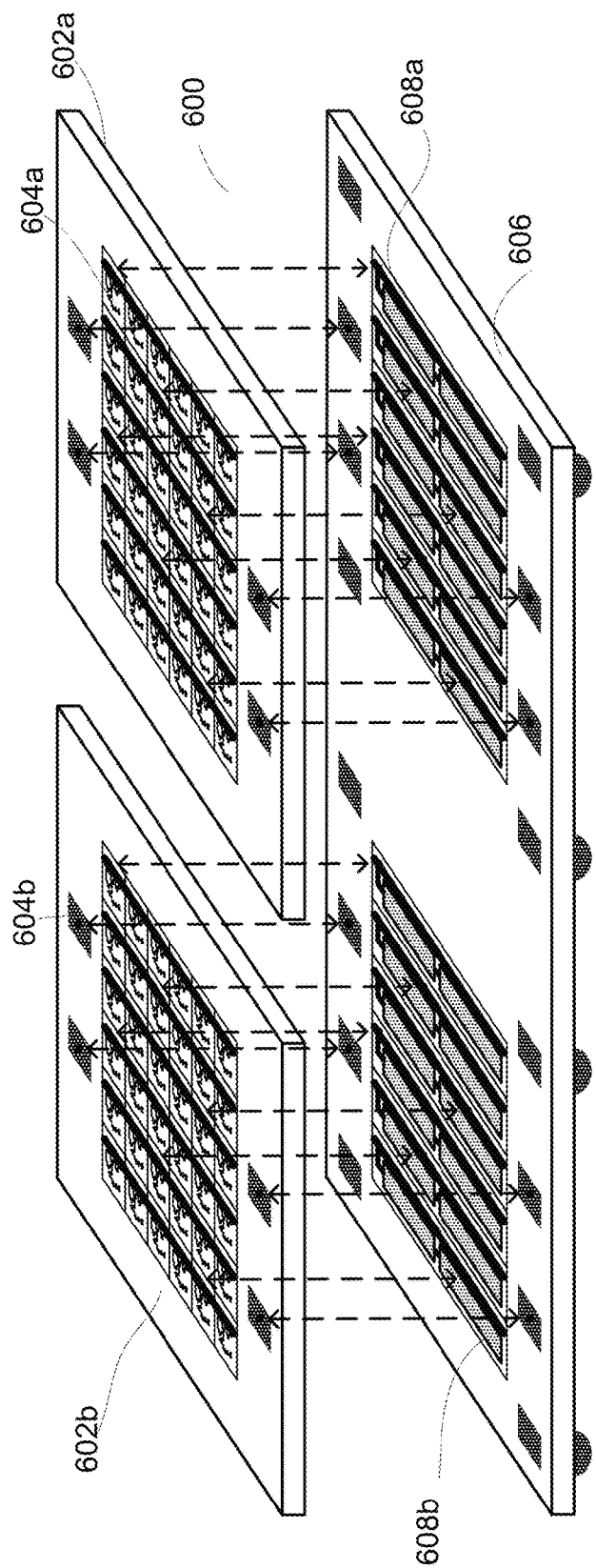
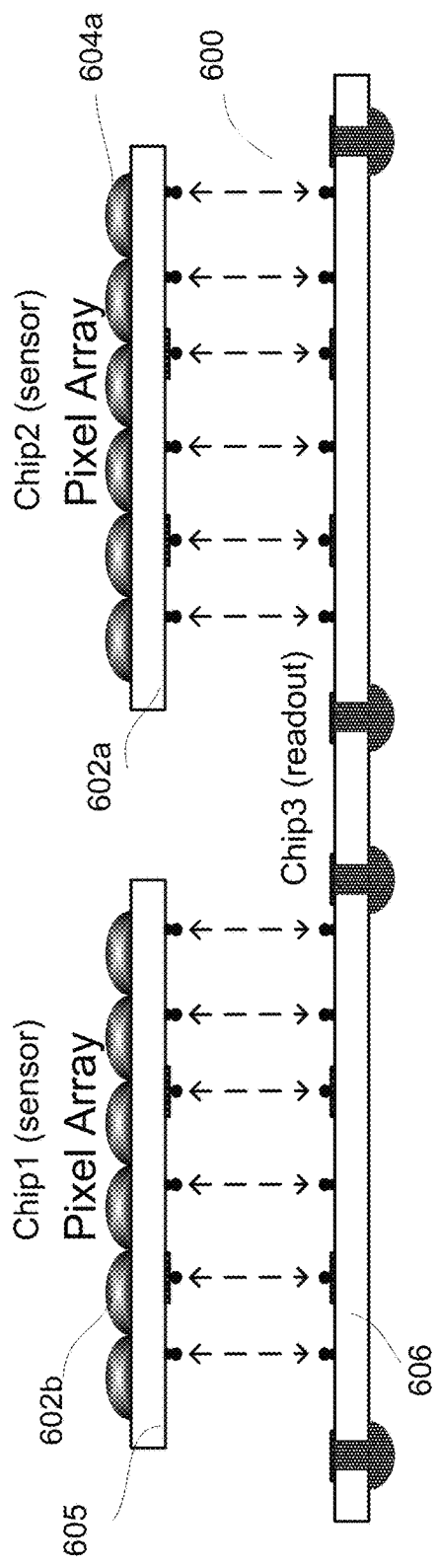
FIG. 6A
FIG. 6B

NOISE AWARE EDGE ENHANCEMENT

CROSS-REFERENCE TO RELATED APPLICATIONS

This application is a continuation of U.S. patent application Ser. No. 16/412,258, filed May 14, 2019 (U.S. Pat. No. 11,115,610), which is a continuation of U.S. patent application Ser. No. 14/214,320, filed Mar. 14, 2014 (U.S. Pat. No. 10,341,588), which claims the benefit of U.S. Provisional Application No. 61/791,113, filed Mar. 15, 2013, which are incorporated herein by reference in their entirety, including but not limited to those portions that specifically appear hereinafter, the incorporation by reference being made with the following exception: In the event that any portion of any of the above-referenced applications are inconsistent with this application, this application supersedes said above-referenced provisional application.

STATEMENT REGARDING FEDERALLY SPONSORED RESEARCH OR DEVELOPMENT

Not Applicable.

BACKGROUND

Advances in technology have provided advances in imaging capabilities for medical use. One area that has enjoyed some of the most beneficial advances is that of endoscopic surgical procedures because of the advances in the components that make up an endoscope.

The disclosure relates generally to electromagnetic sensing and sensors relates to increasing the edge detection within frames of an enhanced video stream. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIGS. 6A and 6B illustrate a perspective view and a side view, respectively, of an implementation of an imaging sensor having a plurality of pixel arrays for producing a three dimensional image, wherein the plurality of pixel arrays and the image sensor are built on a plurality of substrates.

DETAILED DESCRIPTION

Figure 1:
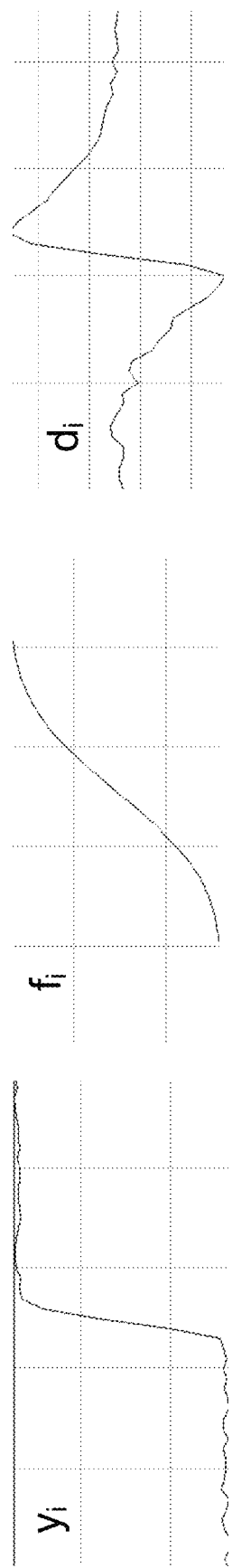
FIG. 1 illustrates a graphical representation of image frame enhancement in accordance with the principles and teachings of the disclosure.

The disclosure extends to methods, systems, and computer based products for enhancing edges within an image in a light deficient environment, which may utilize knowledge of the expected noise pixel by pixel, to control the strength of the edge enhancement and thereby limit the impact of the enhancement on the perception of noise. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

For any digital imaging system, the final quality of video depends fundamentally on the engineering details of the front-end image electronic capture process. Broadly speaking, perceived image quality is dependent on the following properties:

Signal to noise ratio (SNR)
Dynamic range (DR)
Spatial resolution
Perception of visible unnatural artifacts
Perception of spatial distortion
Color fidelity and appeal In general, manufacturers of cameras and imaging devices for many common purposes face continuous pressure toward greater miniaturization and lower cost. Both factors may have a detrimental effect however, on their ability to deliver high quality images.

One of the most significant properties by which image quality is adjudged in modern digital imaging is perceived resolution. This comes from a combination of actual spatial resolution and acutance. Spatial resolution is dictated by several factors, for example, pixel density, focus, optical modulation transfer function (MTF) etc. Acutance refers to the local contrast around sudden transitions in luminance. This may be artificially enhanced within image processing pipelines (ISPs) in a process known as edge enhancement. The basic approach is to detect significant luminance transitions and to augment them by undershooting at the bottom and overshooting at the top of each transition.

Psychophysics experiments performed on human subjects demonstrate that the application of edge enhancement is effective in rendering images and video streams more subjectively pleasing, since it increases the definition of objects and textures. In fact the human eye itself performs a degree of edge enhancement within the retina, which may be observed in a simple experiment in which one stares at a black to white step transition.

One implementation involves first extracting the luminance component, then detecting edges using, e.g., the Canny approach or the unsharp mask method, applying some gain factor to the edge data and adding the edge data back to the original luminance. The main challenge is to be able to separate true edge and texture information from random noise, which is omnipresent. In a typical modern digital camera, for any appreciable amount of detected light signal the dominant temporal noise source arises from the random Poisson uncertainty in photon arrival rate and not the electronic variations that are introduced by the capture device. This is usually referred to as shot noise.

If the random noise becomes enhanced, it reduces the signal to noise ratio. Therefore the image quality, instead of being improved, is quickly degraded. Normally the edge enhancement algorithm would involve some kind of threshold application in order to apply the enhancement only when comfortably above the noise distribution. A difficulty arises from the fact that the noise increases as a function of the signal and greater edge enhancement is desirable at higher signal levels. If the threshold is excessively high then large edges may become disproportionately enhanced with respect to small transitions and textures. This can result in an unnatural, cartoon-like image.

Understanding the origin of the random temporal noise enables one to predict the optimal real-time placement of the threshold. In fact, if one knows the local signal in electronic units, sigma of the dominant shot noise component is known exactly, since it is always equal to the square root of the mean signal.

This disclosure describes an edge enhancement application algorithm, which continuously varies the threshold pixel by pixel, guided by knowledge of the expected local noise. Continual spatial and temporal tweaking of the threshold in this way allows the most ideal compromise between edge enhance efficacy and noise control. The option to do it precisely depends on the availability of the calibration of the captured signal from digital number to electrons, for all relevant sensor gains.

Having extracted a pure luminance image component, there are several methods that can be employed in order to determine the whereabouts and amplitude of edges present within an image. The example described here is the so-called 'unsharp-mask' approach, which may be implemented in hardware and software. Other implementations could alternatively use the Canny method, in which an edge detect operator kernel, (e.g. Sobel, Roberts or Prewitt), is applied to a spatially filtered version of the image, the Laplacian method, which detects zero crossings in the second order derivative, or the SUSAN method, amongst others.

Referring now to FIG. 1, in the unsharp mask method, a spatially filtered version of the luminance plane may be made and then subtract it from the original to make a difference plane. Flat areas will have a net result of zero, while transitions will result in a local bipolar signal having amplitudes that scale with the spatial frequency. The spatial filter can, e.g., be a Gaussian filter kernel, H, of dimension 7×7:

$$H = \frac{1}{140}\begin{bmatrix} 1 & 1 & 2 & 2 & 2 & 1 & 1 \\ 1 & 2 & 2 & 4 & 2 & 2 & 1 \\ 2 & 2 & 4 & 8 & 4 & 2 & 2 \\ 2 & 4 & 8 & 16 & 8 & 4 & 2 \\ 2 & 2 & 4 & 8 & 4 & 2 & 2 \\ 1 & 2 & 2 & 4 & 2 & 1 & 1 \\ 1 & 1 & 2 & 2 & 2 & 1 & 1 \end{bmatrix}$$

If $f_i$ is the filtered version of the luminance $y_i$ of pixel i, then;

$$f_i = H * y_i$$

The difference plane, di, is defined by;

$$d_i = y_i - f_i$$

FIG. 1 shows the shape of $y_i$, $f_i$ and $d_i$ for a 1D step transition.

The resultant difference plane is effectively a high-pass filtered version which may then be multiplied by a gain factor before being added back to the original luminance plane. This gain factor will govern the strength of the edge enhancement.

In this particular algorithm, the gain factor, g, is the product of two positive, real components, referred to as $\alpha_i$ and $\beta$;

$$g = \alpha_i \beta$$

Therefore the final luminance representation, $Y_i$, is given by:

$$Y_i = y_i + \alpha_i \beta \cdot d_i$$

The $\alpha_i$ factor has a maximum of unity and its magnitude will be determined based upon what is happening locally within the image. The β factor is just a strength adjuster that may be presented to the camera operator to tune according to their taste.

To decide what α should be, the signal calibration must first be applied to convert the luminance to electronic units. The following expression can be used to compute the calibration factor, K, (in e–/DN), if the internal sensor properties known as the conversion gain ε, (in μV/e–) and the ADC voltage swing, W, (in V), are known:

$$K_G = \frac{W}{G \cdot \varepsilon \cdot (2^n - 1)}$$

Where n=the number of ADC bits and G is the absolute overall linear gain applied on the sensor. If G is in logarithmic units (dB) the expression becomes:

$$K_G = \frac{W}{10^{G/20} \cdot \varepsilon \cdot (2^n - 1)}$$

If the sensor design parameters are unknown, K can be determined empirically by plotting photon transfer curves of noise (in $DN^2$) versus signal (in DN) for a broad range of gains. In this case, $K_G$ is equal to the reciprocal of the gradient within the linear region of the graph for each gain.

Figure 2:
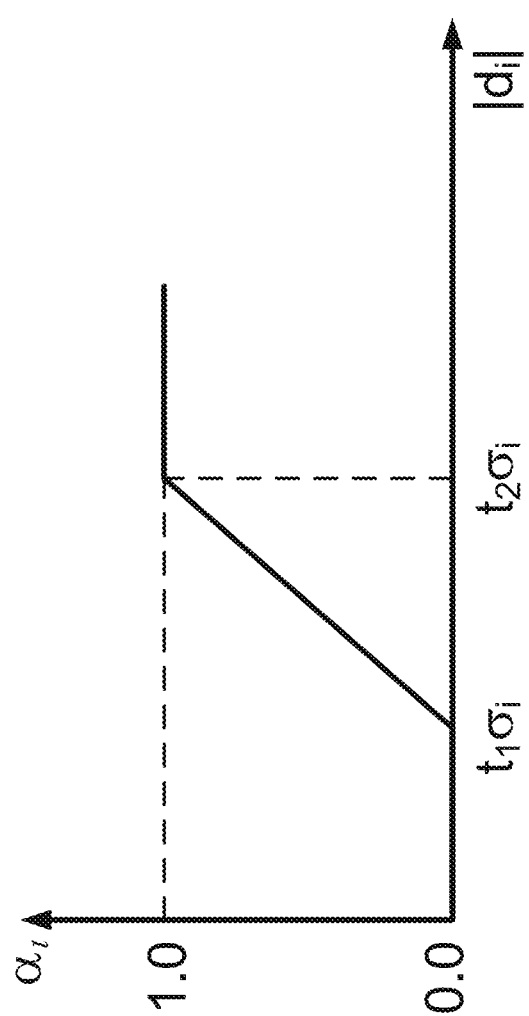
FIG. 2 is an illustration of a graphical representation of image edge data in accordance with the principles and teachings of the disclosure.

Once K is known it may be used to predict the magnitude of the noise expectation, $\sigma_i$ (in DN) for pixel i, based on the local filtered luminance, $f_i$;

$$\sigma_i = \frac{\sqrt{c^2 + K_G(f_i - B)}}{K_G}$$

where B is the sensor black offset at the output (in DN) and c is the sensor read noise (noise floor) in e–. FIG. 2 shows an example of how a might be constructed to depend upon the modulus of $d_i$. In this example, $\alpha_i$ follows a linear dependence. Other implementations could be conceived in which $\alpha_i$ is not linear, but has some other mathematical progression between zero and any positive, real number.

For example:

$$\alpha_i = \begin{cases} \frac{(|d_i| - t_1 \cdot \sigma_i)}{(t_2 \cdot \sigma_i - t_1 \cdot \sigma_i)} & \text{for } (t_1 \cdot \sigma_i) < |d_i| < (t_2 \cdot \sigma_i) \\ 0.0 & \text{for } |d_i| < (t_1 \cdot \sigma_i) \\ 1.0 & \text{for } |d_i| > (t_2 \cdot \sigma_i) \end{cases}$$

The transition points for $\alpha_i$, $t_1$ and $t_2$ would be tuned in accordance with the most pleasing result and depending upon the functional form of $\alpha$ employed.

A similar approach is to compute the noise variance instead of the sigma and to determine $\alpha_i$ based upon the square of the difference parameter $d_i$ instead of the modulus. This is beneficial for an implementation in hardware since it avoids the square root calculation.

In that case, the variance expectation;

$$v_i = \frac{c^2 + K_G(f_i - B)}{K_G^2} (DN^2)$$

and $$\alpha_i = \begin{cases} \frac{(d_i^2 - w_1 \cdot v_i)}{(w_2 \cdot v_i - w_1 \cdot v_i)} & \text{for } (w_1 \cdot v_i) < d_i^2 < (w_2 \cdot v_i) \\ 0.0 & \text{for } d_i^2 < (w_1 \cdot v_i) \\ 1.0 & \text{for } d_i^2 > (w_2 \cdot v_i) \end{cases}$$

With $w_1$ and $w_2$ replacing $t_1$ and $t_2$ as the two quality tuning parameters.

In practice the implementation of real-time square root operations and division operations are non-trivial. Usual implementation involves multiplying by reciprocals or using pre-compiled look up tables. Multiplying by reciprocals works very well if the divisor is a constant and the second method works well if the range of values in the look up tables is small. A perfect implementation would calculate the amount of enhance to apply to each pixel based on its noise value.

Another implementation, which may be implemented in hardware, may use knowledge of the applied gain and resulting noise to modify the amount of enhance on a per-frame basis instead of pixel by pixel. Complicated (division and square-root) operations will be dependent not on changing pixel values, but on differences in frame values.

In this case, the major enhance equation is:

$$Y_e = Y_o + D \cdot G \cdot (Yf_a - Yf_b)$$

$Yf_a$ is a 7×7 gaussian blur of the image.
$Yf_b$ is a 3×3 gaussian blur of the image.

$Yf_a - Yf_b$ is an edge detection between a very (7×7) blurred version of the image and a less (3×3) blurred version of the image. This difference is gained by the product of G and D.

G is a gain factor ranging from 0 to n, where n can be any number greater than 0 with a defined upper limit.

D is a weighting factor ranging from 0 to 1. D is generated by setting twiddling factors $d_{high}$ and $d_{low}$. The equation for D is:

$$D = \begin{cases} \frac{(|Yf_a - Yf_b| - d_{low})}{(d_{high} - d_{low})} & \text{for } d_{low} < |Yf_a - Yf_b| < d_{high} \\ 0.0 & \text{for } |Yf_a - Yf_b| < d_{low} \\ 1.0 & \text{for } |Yf_a - Yf_b| > d_{high} \end{cases}$$

$d_{high}$ and $d_{low}$ are set in the software. $d_{high}$ is based on the amount of gain added to the sensor. If the gain value is low, $d_{low}$ is low, as the gain increases, so does $d_{high}$. As gain and $d_{high}$ increase, the slope of D flattens out. As a result, the enhance equation requires a greater amount of difference in the high pass filter before it will gain up the detected edge. Because gain adds noise, the system responds to high gain situations by requiring greater edge differentiation before enhancement. In low gain and low noise situations the system can interpret smaller differences as edges and enhance them appropriately.

It will be appreciated that implementations of the disclosure may comprise or utilize a special purpose or general-purpose computer including computer hardware, such as, for example, one or more processors and system memory, as discussed in greater detail below. Implementations within the scope of the disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. In an implementation, a sensor and camera control unit may be networked in order to communicate with each other, and other components, connected over the network to which they are connected. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, control units, camera control units, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

Figure 3A:
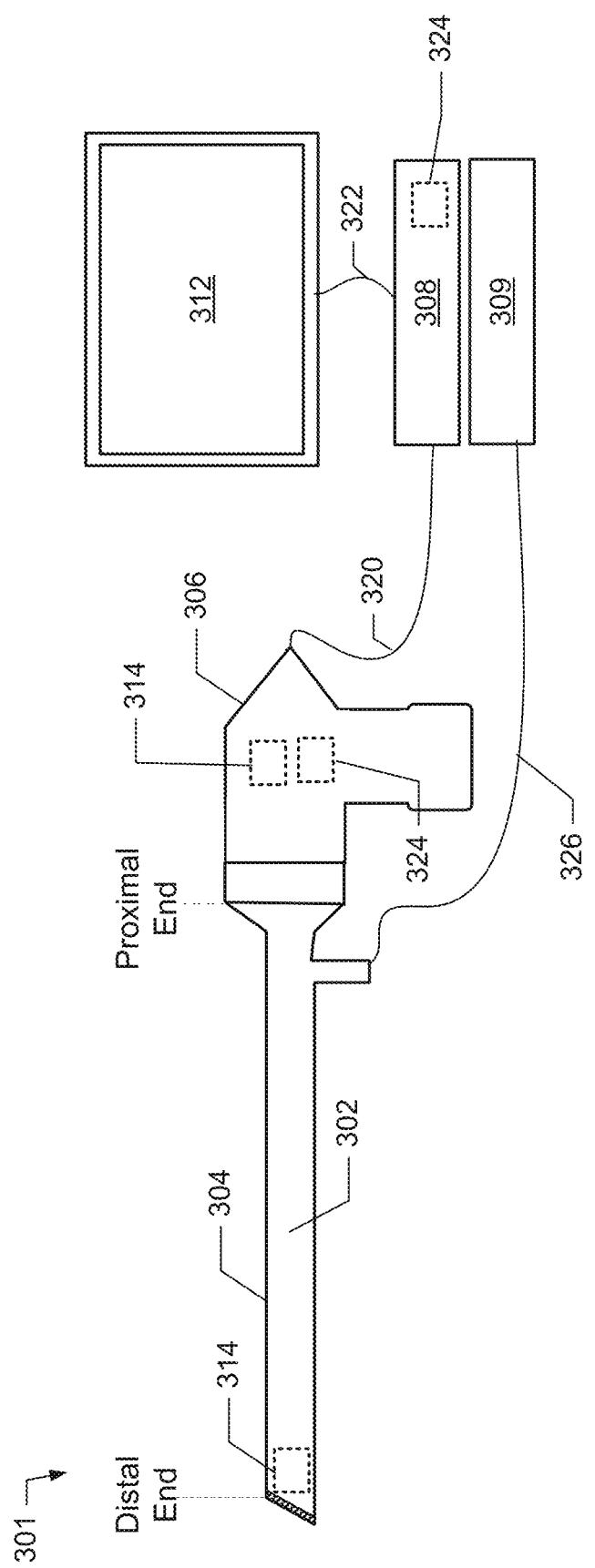
FIGS. 3A and 3B illustrate a system and method for enhancing edges within an image in a light deficient environment in accordance with the principles and teachings of the disclosure.
Figure 3B:
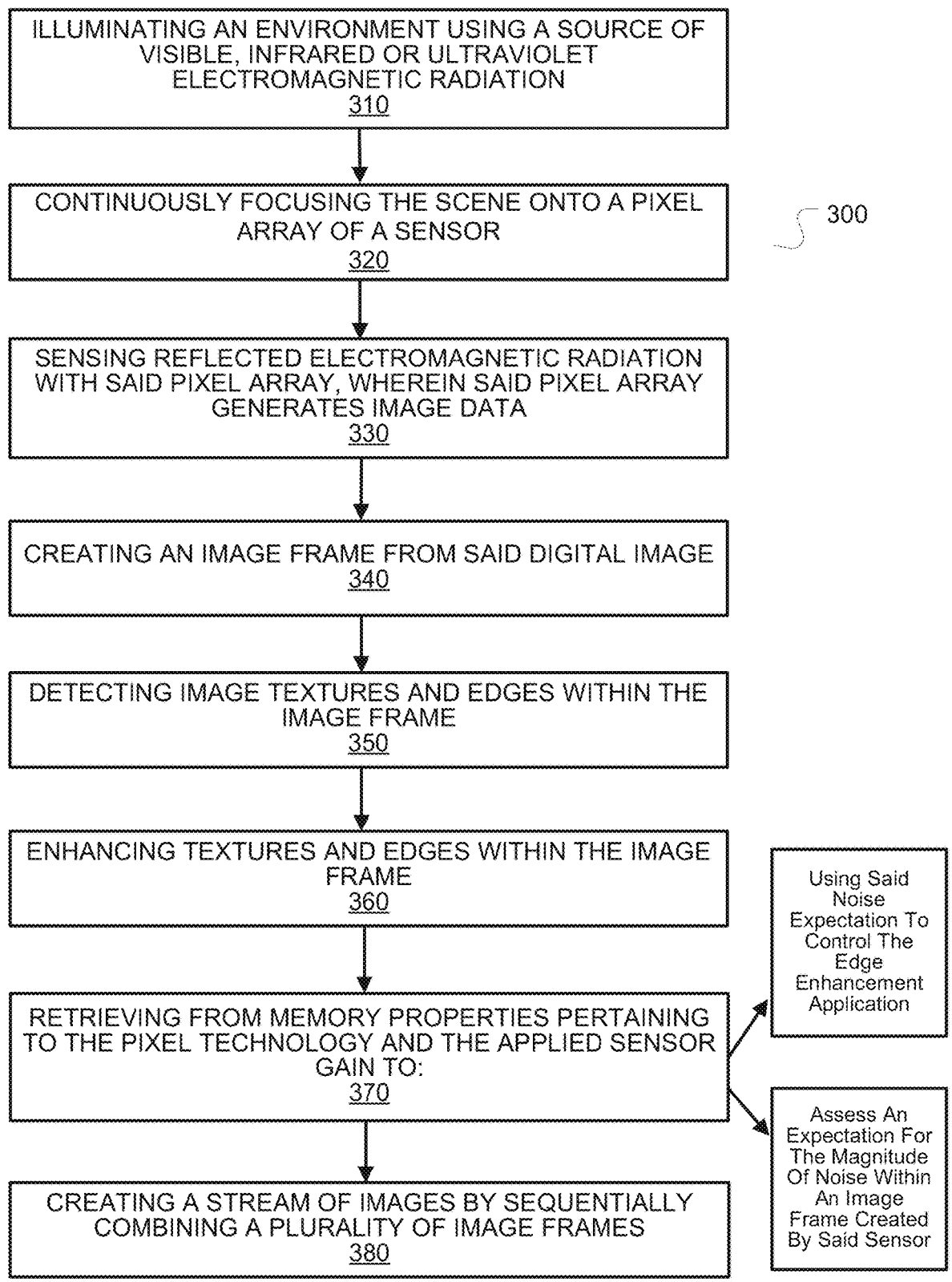

Referring now to FIGS. 3A and 3B, there is illustrated a digital imaging system and method 300 for enhancing edges within an image in a light deficient environment. The digital imaging system 301 illustrated in FIG. 3A may comprise an endoscopic device 302 for use in ambient light deficient environment. The endoscopic device 302, in turn, may include an endoscope 304, an endoscope housing 306 (e.g., hand piece and/or camera head), control unit 308, an electronic communication 320, such as an electronic cable, light source 309, a light cable 326, such as a fiber optic cable, connected to light source 309 and endoscopic device 302, display 312, and imaging device 314 (e.g., image sensor and related circuitry etc.). Note that in this example, to facilitate discussion, the endoscope device 304, endoscope housing 306, control unit 308, light source 309, display 312, and imaging device 314 are each shown individually with respect to one another. However, it is to be appreciated and understood that this is not to be interpreted as limiting, and any one or more of these components can be integrated and/or connected in any suitable way.

It will be appreciated that imaging device 314 may include an image sensor comprising a pixel array, wherein a scene is continuously focused onto the pixel array. It will be appreciated that the image sensor senses reflected electromagnetic radiation using or with the pixel array. The pixel array generates image data and an image frame is created from the image data. A processor 324 may detect image textures and edges within the image frame and may further enhance textures and edges within the image frame. The processor 324, whether in the housing 306 or at the control unit 308, may also retrieve from memory properties pertaining to the pixel technology and the applied sensor gain to assess an expectation for the magnitude of noise within an image frame created by said sensor and using said noise expectation to control the edge enhancement application. A stream of images may be created by sequentially combining a plurality of the image frames.

Referring now to FIG. 3B, a digital imaging method for use with an endoscope in ambient light deficient environments is illustrated. The method 300 may comprise illuminating an environment using a source of visible, infrared or ultraviolet electromagnetic radiation at 310. At 320, the method 300 may comprise continuously focusing the scene onto a pixel array of a sensor. The method 300 may comprise sensing reflected electromagnetic radiation with said pixel array, wherein said pixel array generates image data at 330. At 340, the method 300 may comprise creating an image frame from said image data. At 350, the method 300 may comprise detecting image textures and edges within the image frame. The method 300 may comprise enhancing textures and edges within the image frame at 360. At 370, the method 300 may comprise retrieving from memory properties pertaining to the pixel technology and the applied sensor gain to: assess an expectation for the magnitude of noise within an image frame created by said sensor and using said noise expectation to control the edge enhancement application. At 380, the method 300 may comprise creating a stream of images by sequentially combining a plurality of image frames.

The system and method of FIGS. 3A and 3B may include providing edge enhancements as disclosed herein. The edge enhancement may comprise a plurality of enhancements within the original image generated by the pixel array that correspond to variations of noise due to variations in photo-signal. The degree of applied edge enhancement may be governed by a digital gain factor applied to the detected edges, which depends on expected noise. The system may include creating a three dimensional image stream by combining the image frames of a plurality of pixel arrays disposed on a plurality of substrates that are stacked.

The system and method may further comprise calculating noise correction based on a combination of Poisson statistics of photon arrival and electronic noise arising from the pixel array and its readout electronics. The may include computing the expected noise, knowing the conversion gain of each pixel within the pixel array the applied sensor gain and the voltage range of the digitizer.

The system and method of FIGS. 3A and 3B may further comprise deriving an empirical determination of the expected noise from a database of laboratory experiments conducted for the pixel array. The system and method may include varying a level of illumination and plotting the signal in digital number (DN) versus the noise is $DN^2$ and recoding them into memory. The empirical determination may be repeated for a plurality of applied sensor gain settings. It will be appreciated that the system and method may further comprise measuring a gradient within the plot. It will be appreciated that in an implementation, the digital gain factor may be assessed locally for each pixel, or within a local group of pixels. In an implementation, the digital gain factor may be determined for a whole frame, based on the applied sensor gain. In an implementation, the digital gain factor may be derived from a comparison of an edge strength parameter to the expected noise located near each pixel. In an implementation, the system and method may further comprise controlling the degree of edge enhancement and involves applying the digital gain factor to the edge strength parameter and adding the result to the luminance component of the original image.

In an implementation, the edge strength parameter may be taken to be a modulus of a difference between two spatially filtered versions of the luminance component of the original image, with different filter kernels applied to each. In an implementation, the edge strength parameter may be taken to be the modulus of the difference between one spatially filtered and one unfiltered version of the luminance component of the original frame.

Figure 4A:
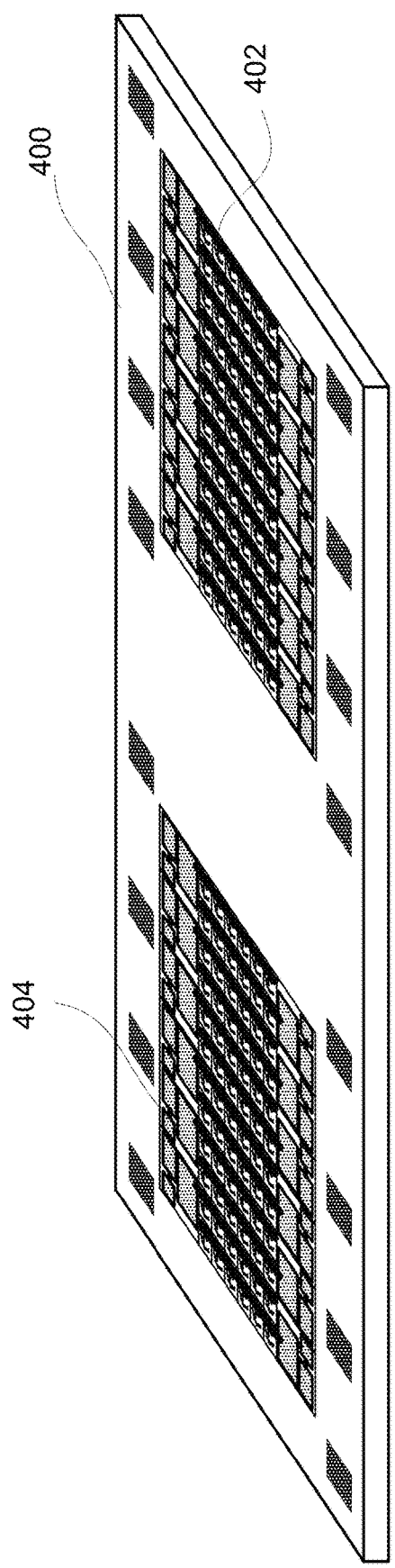
FIGS. 4A and 4B illustrate a perspective view and a side view, respectively, of an implementation of a monolithic sensor having a plurality of pixel arrays for producing a three dimensional image in accordance with the teachings and principles of the disclosure.
Figure 4B:
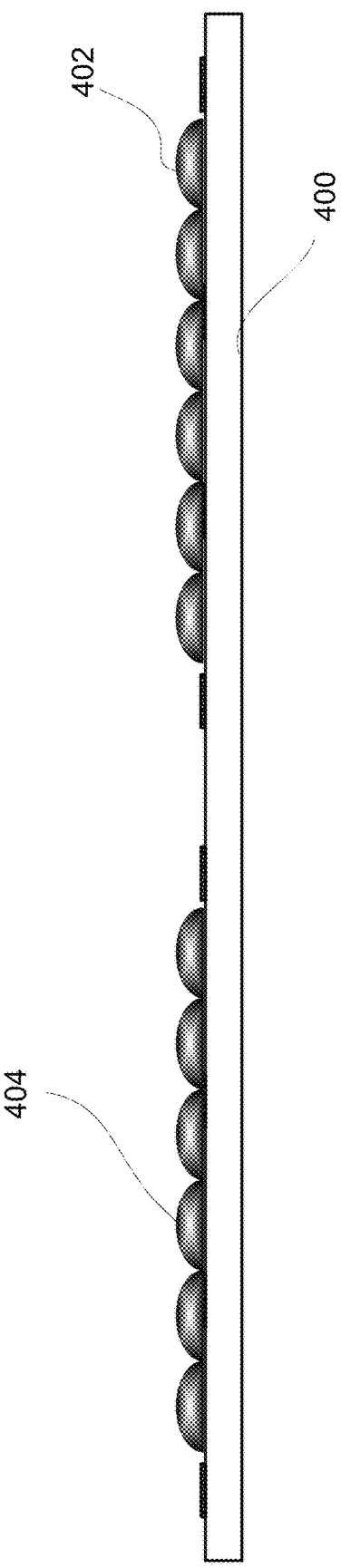

Referring now to FIGS. 4A and 4B, the figures illustrate a perspective view and a side view, respectively, of an implementation of a monolithic sensor 400 having a plurality of pixel arrays for producing a three dimensional image in accordance with the teachings and principles of the disclosure. Such an implementation may be desirable for three dimensional image capture, wherein the two pixel arrays 402 and 404 may be offset during use. In another implementation, a first pixel array 402 and a second pixel array 404 may be dedicated to receiving a predetermined range of wave lengths of electromagnetic radiation, wherein the first pixel array 402 is dedicated to a different range of wave length electromagnetic radiation than the second pixel array 404.

Figure 5A:
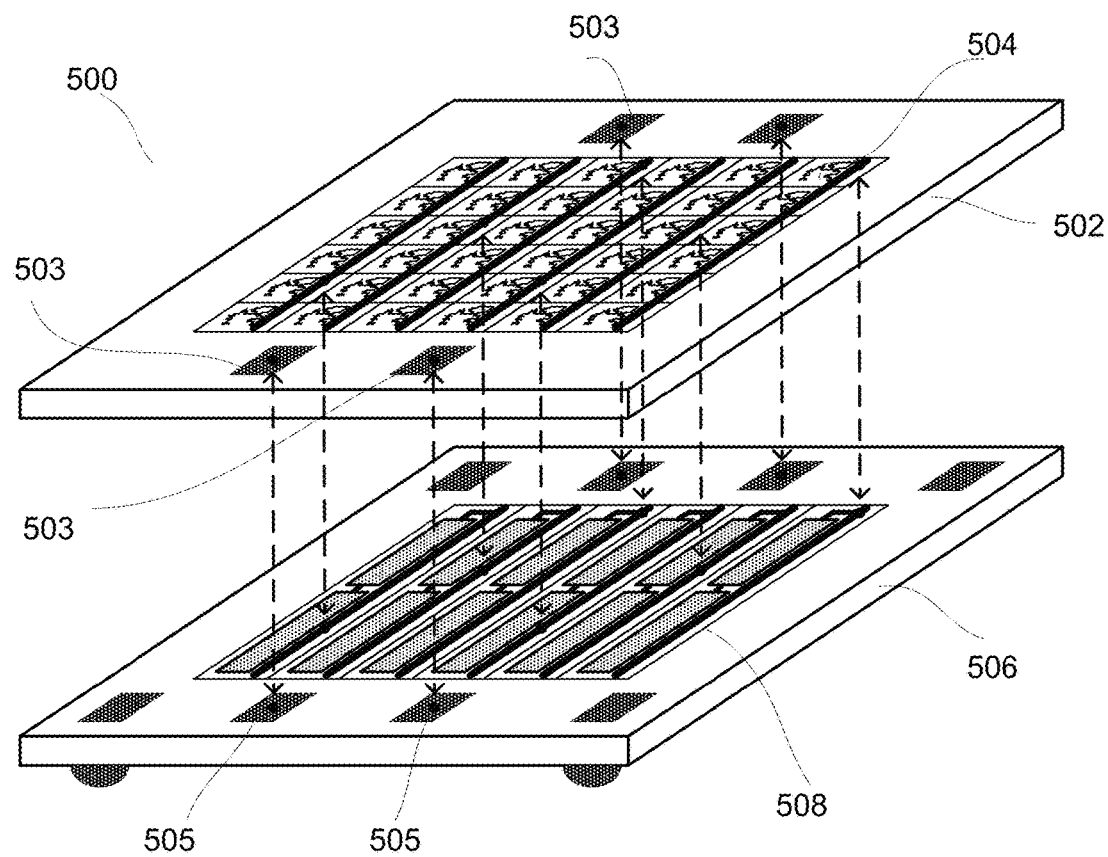
FIGS. 5A and 5B illustrate a perspective view and a side view, respectively, of an implementation of an imaging sensor built on a plurality of substrates, wherein a plurality of pixel columns forming the pixel array are located on the first substrate and a plurality of circuit columns are located on a second substrate and showing an electrical connection and communication between one column of pixels to its associated or corresponding column of circuitry.
Figure 5B:
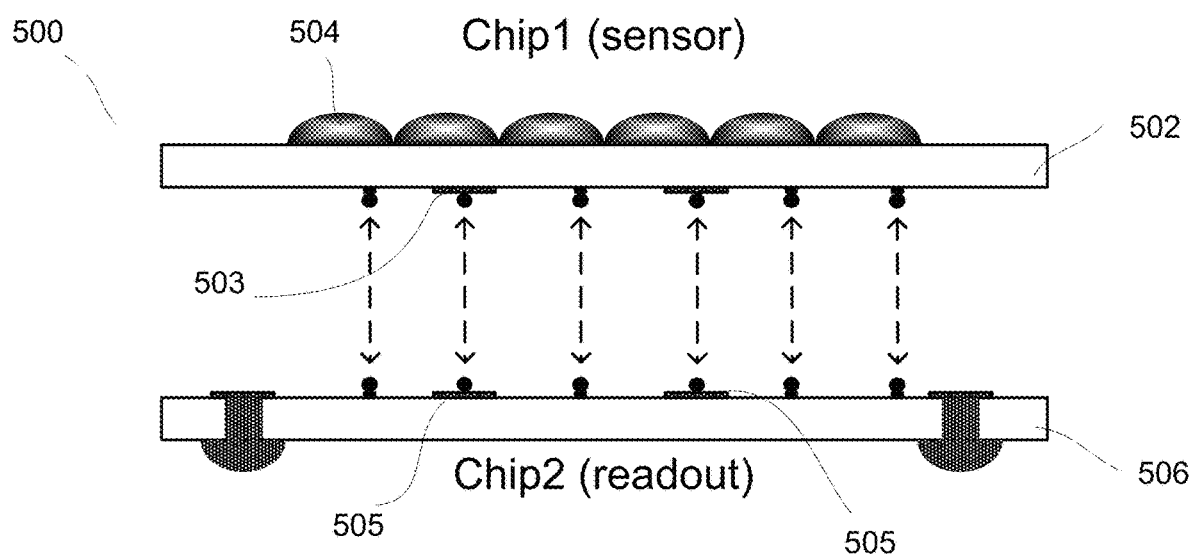

FIGS. 5A and 5B illustrate a perspective view and a side view, respectively, of an implementation of an imaging sensor 500 built on a plurality of substrates. As illustrated, a plurality of pixel columns 504 forming the pixel array are located on the first substrate 502 and a plurality of circuit columns 508 are located on a second substrate 506. Also illustrated in the figure are the electrical connection and communication between one column of pixels to its associated or corresponding column of circuitry. In one implementation, an image sensor, which might otherwise be manufactured with its pixel array and supporting circuitry on a single, monolithic substrate/chip, may have the pixel array separated from all or a majority of the supporting circuitry.

The disclosure may use at least two substrates/chips, which will be stacked together using three-dimensional stacking technology. The first 502 of the two substrates/chips may be processed using an image CMOS process. The first substrate/chip 502 may be comprised either of a pixel array exclusively or a pixel array surrounded by limited circuitry. The second or subsequent substrate/chip 506 may be processed using any process, and does not have to be from an image CMOS process. The second substrate/chip 506 may be, but is not limited to, a highly dense digital process in order to integrate a variety and number of functions in a very limited space or area on the substrate/chip, or a mixed-mode or analog process in order to integrate for example precise analog functions, or a RF process in order to implement wireless capability, or MEMS (Micro-Electro-Mechanical Systems) in order to integrate MEMS devices. The image CMOS substrate/chip 502 may be stacked with the second or subsequent substrate/chip 506 using any three-dimensional technique. The second substrate/chip 506 may support most, or a majority, of the circuitry that would have otherwise been implemented in the first image CMOS chip 502 (if implemented on a monolithic substrate/chip) as peripheral circuits and therefore have increased the overall system area while keeping the pixel array size constant and optimized to the fullest extent possible. The electrical connection between the two substrates/chips may be done through interconnects 503 and 505, which may be wirebonds, bump and/or TSV (Through Silicon Via).

FIGS. 6A and 6B illustrate a perspective view and a side view, respectively, of an implementation of an imaging sensor 600 having a plurality of pixel arrays for producing a three dimensional image. The three dimensional image sensor may be built on a plurality of substrates and may comprise the plurality of pixel arrays and other associated circuitry, wherein a plurality of pixel columns 604a forming the first pixel array and a plurality of pixel columns 604b forming a second pixel array are located on respective substrates 602a and 602b, respectively, and a plurality of circuit columns 608a and 608b are located on a separate substrate 606. Also illustrated are the electrical connections and communications between columns of pixels to associated or corresponding column of circuitry.

Figure 7:
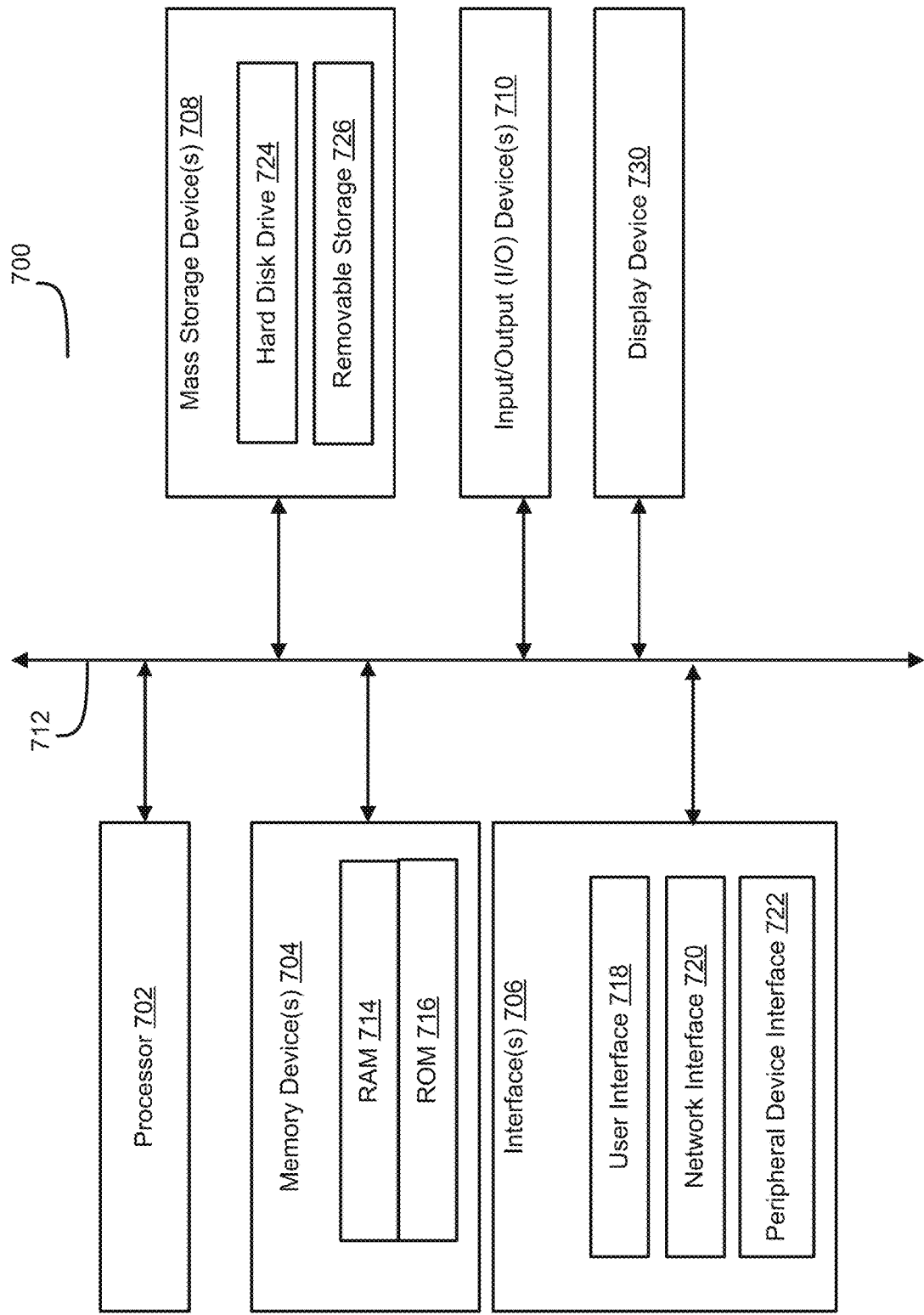
FIG. 7 is a schematic view of complementary system hardware in accordance with the principles and teachings of the disclosure.

FIG. 7 is a block diagram illustrating an example computing device 700. Computing device 700 may be used to perform various procedures, such as those discussed herein. Computing device 700 can function as a server, a client, or any other computing entity. Computing device can perform various monitoring functions as discussed herein, and can execute one or more application programs, such as the application programs described herein. Computing device 700 can be any of a wide variety of computing devices, such as a desktop computer, a notebook computer, a server computer, a handheld computer, camera control unit, tablet computer and the like.

Computing device 700 includes one or more processor(s) 702, one or more memory device(s) 704, one or more interface(s) 706, one or more mass storage device(s) 708, one or more Input/Output (I/O) device(s) 710, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 5, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

It will be appreciated that the teachings and principles of the disclosure may be used in a reusable device platform, a limited use device platform, a re-posable use device platform, or a single-use/disposable device platform without departing from the scope of the disclosure. It will be appreciated that in a re-usable device platform an end-user is responsible for cleaning and sterilization of the device. In a limited use device platform the device can be used for some specified amount of times before becoming inoperable. Typical new device is delivered sterile with additional uses requiring the end-user to clean and sterilize before additional uses. In a re-posable use device platform a third-party may reprocess the device (e.g., cleans, packages and sterilizes) a single-use device for additional uses at a lower cost than a new unit. In a single-use/disposable device platform a device is provided sterile to the operating room and used only once before being disposed of.

Additionally, the teachings and principles of the disclosure may include any and all wavelengths of electromagnetic energy, including the visible and non-visible spectrums, such as infrared (IR), ultraviolet (UV), and X-ray.

It will be appreciated that various features disclosed herein provide significant advantages and advancements in the art. The following implementations are exemplary of some of those features.

In the foregoing Detailed Description of the Disclosure, various features of the disclosure are grouped together in a single implementation for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed implementation.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A digital imaging method for use in ambient light deficient environments comprising:
   illuminating an environment using a source of electromagnetic radiation;

sensing reflected electromagnetic radiation with a pixel array of an image sensor, wherein said pixel array generates image data;
creating an image frame from said image data;
detecting image textures and edges within the image frame;
retrieving noise assessment information from memory comprising one or more of:
properties pertaining to a pixel technology of the pixel array of the image sensor; and
Poisson statistics of photon arrival;
assessing a noise expectation within the image frame created by said image sensor based on the noise assessment information;
enhancing textures and edges within the image frame by using said noise expectation to control the enhancing of the textures and edges within the image frame;
determining a threshold value for noise correction within the image frame; and
varying in the threshold value pixel by pixel based on expected local noise within the image frame;
wherein controlling the enhancing of the textures and edges within the image frame for each pixel is based on whether or not the noise expectation for each pixel is above or below the threshold value.

2. The method of claim 1, wherein the noise expectation is one or more of:
an expectation of noise magnitude within the image frame; and
an expectation of noise variance within the image frame.

3. The method of claim 1, wherein the properties pertaining to the pixel technology of the pixel array of the image sensor comprise a known conversion gain of the image sensor.

4. The method of claim 1, wherein the properties pertaining to the pixel technology of the pixel array of the image sensor comprise an applied sensor gain of the image sensor.

5. The method of claim 1, wherein the properties pertaining to the pixel technology of the pixel array of the image sensor comprise one or more of:
electronic noise arising from the pixel array and the pixel array's readout electronics; and
an empirical determination of expected noise from a database of experiments conducted for the pixel array of the image sensor.

6. The method of claim 1, wherein a degree of applied edge enhancement is governed by a digital gain factor applied to detected image textures and edges, which digital gain factor depends on the noise expectation within the image frame.

7. The method of claim 6, wherein the digital gain factor is assessed individually for each pixel in the pixel array based on noise in each pixel.

8. The method of claim 6, wherein the digital gain factor is assessed for local groups of pixels in the pixel array based on noise in the local groups of pixels.

9. The method of claim 6, wherein the digital gain factor is assessed for the whole pixel array based on noise in the image frame.

10. The method of claim 1, wherein assessing the noise expectation within the image frame is based on one or more of the known-conversion gain of the pixel array, the applied sensor gain, and a voltage range of a digitizer.

11. The method of claim 6, wherein the digital gain factor is derived from a comparison of an edge strength parameter to the noise expectation at or near each pixel.

12. The method of claim 11, wherein said edge strength parameter is taken to be a modulus of a difference between two spatially filtered versions of a luminance component of the image frame, with different filter kernels applied to each.

13. The method of claim 11, wherein said edge strength parameter is taken to be a modulus of a difference between one spatially filtered and one unfiltered version of a luminance component of the image frame.

14. The method of claim 11, wherein controlling the degree of edge enhancement involves applying said digital gain factor to said edge strength parameter to get a result and adding the result to a luminance component of the image frame.

15. A digital imaging system comprising:
an imaging device for use in ambient light deficient environments;
a source of electromagnetic radiation for illuminating an environment;
an image sensor that senses reflected electromagnetic radiation with a pixel array of the image sensor,
wherein said pixel array generates image data;
wherein an image frame is created from said image data;
wherein a processor:
detects one or more of image textures and edges within the image frame;
retrieves noise assessment information from memory comprising one or more of:
properties pertaining to a pixel technology of the pixel array of the image sensor; and
Poisson statistics of photon arrival;
assesses a noise expectation within the image frame created by said image sensor based on the noise assessment information;
enhances textures and edges within the image frame by using said noise expectation to control the enhancing of the textures and edges within the image frame;
determines a threshold value for noise correction within the image frame; and
varies the threshold value pixel by pixel based on expected local noise within the image frame;
wherein controlling the enhancing of the textures and edges within the image frame for each pixel is based on whether or not the noise expectation for each pixel is above or below the threshold value.

16. The system of claim 15, wherein the noise expectation is one or more of:
an expectation of noise magnitude within the image frame; and
an expectation of noise variance within the image frame.

17. The system of claim 15, wherein the properties pertaining to the pixel technology of the pixel array of the image sensor comprise on or more of:
a known conversion gain of the image sensor;
an applied sensor gain of the image sensor;
electronic noise arising from the pixel array and the pixel array's readout electronics; and
an empirical determination of expected noise from a database of experiments conducted for the pixel array of the image sensor.

18. The system of claim 15, wherein a degree of applied edge enhancement is governed by a digital gain factor applied to detected image textures and edges, which digital gain factor depends on the noise expectation within the image frame, wherein the digital gain factor is assessed:
individually for each pixel in the pixel array based on noise in each pixel;

for local groups of pixels in the pixel array based on noise in the local groups of pixels; or for the whole pixel array based on noise in the image frame.

\* \* \* \* \*